Patented Feb. 4, 1941

2,230,343

UNITED STATES PATENT OFFICE 2,230,343

PROCESS OF MANUFACTURING GLASS

George J. Bair, Pittsburgh, Pa., assignor to Norbert S. Garbisch, Butler, Pa.

No Drawing. Application December 16, 1937, Serial No. 180,137

1 Claim. (Cl. 49—77)

The present invention relates to processes of treating and utilizing pulverulent siliceous materials. It relates more particularly to processes of treating and utilizing the finely divided and intimately associated mixture of pulverized sand and glass debris resulting, as a waste product, from the grinding or surfacing of plate glass.

One object of the invention is to provide a process of so treating the above described materials that they may be placed in a condition in which they will be of commercial value. The preferred treatment is designed to render the waste material sufficiently coherent and heat conductive that it may be used as one of the ingredients in the manufacture of glass.

This and other objects of the present invention will become more apparent from the following detailed description.

Glass is commonly prepared by melting or fusing a mixture of sand, lime, soda ash and crushed glass or cullet. The cullet is incorporated into the mixture in order to provide a readily fusible mass and to promote a more rapid melting thereof. Obviously other ingredients may be added to the batch where special effects are sought, but the four ingredients herein mentioned are the primary elements in most glasses. The sand and cullet represent the largest proportion of the glass batch and the price of these two ingredients controls to a large extent the cost of the glass. Manifestly, therefore, a source of sand which is less expensive would be a factor of great importance to the industry.

In the production of plate glass, the sheets of glass are subjected to surfacing or grinding with an abrasive, such as ordinary sand. During the course of the grinding operation, the particles of sand are gradually worn down until they are no longer effective, after which they are discarded. The spent abrasive, comprising an extremely uniform mixture of silica, glass debris and fragments of iron, has an average particle size of about 20 microns. It will be obvious that over the long period of time during which plate glass has been manufactured, large quantities of this finely divided waste sand have been accumulated.

It is now proposed to use this mixture of sand and glass in the production of glass in lieu of the conventional mixture of sand and cullet. The proportion of glass debris contained within the waste sand constitutes from 10 to 25 per cent thereof and corresponds closely to the ratio of cullet usually added to a glass batch. The fineness of subdivision and uniformity of such mixture will promote fluxing of the glass batch. However, this waste sand is of such small particle size that it cannot be used directly in a glass batch. The heat conductivity of a large quantity of the waste material is comparatively low and the batch would be rather slow in melting. In addition, the finely divided sand would tend to insulate the remaining ingredients of the batch and further increase the time of melting. Moreover, if a finely divided sand is fed into a furnace, it will be carried into the flues and the checkerwork of the regenerators, not only occasioning a high material loss but also necessitating frequent shut-downs of the furnace for cleaning.

Briefly stated, the present invention contemplates, as one feature, an increase in the particle size of the waste sand which will enable it to be used directly in the manufacture of glass.

It has been found that this waste material contains a sufficiently high percentage of glass that, upon heating, the fine particles will fuse or weld together into larger agglomerates. In fact, the sintering process will produce such large agglomerates that it is generally necessary to grind the product in order to reduce it to the optimum particle size.

More specifically, the waste sand, taken directly from the dump, is subjected to gradually increasing temperatures to eliminate water therefrom. The heating is continued until the sand reaches a temperature of approximately 600° C. at which point it is maintained for a length of time sufficient to promote an agglomeration of the fine particles of sand and glass. The resultant product is cooled and the larger agglomerates, if necessary, are ground or otherwise reduced to the desired particle size.

In the sintering of the material, small quantities thereof, or larger quantities distributed over heating surfaces of greater dimensions, can be raised to the relatively low sintering temperature with ease, thus greatly reducing the difficulty of obtaining heat conduction through the finely divided material. Heating of the finely divided material preliminarily to its sintering may be further simplified by the presence of soda ash and other glass-producing ingredients.

The glass and silica are even more uniformly blended in the sintered product than when in the original finely divided state, but the sintered agglomerates are still porous and frangible. The physical condition, therefore, permits the sintered material to be reduced into such size as is suitable for addition to a glass batch. The advantage of thorough dissemination of the glass and silica are thus retained and simultaneously satisfactory heat conductivity and freedom from dust in the melting tank are obtained.

The agglomerated masses, as stated, may be broken up if desired into particles of any convenient size or while still plastic they may be molded into briquettes. It might also be desirable under some conditions simply to sinter the pulverulent material into a coherent mass and while it is still hot to feed it into a glass melting furnace, thus obviating the necessity of reheating the material. The material could be fed into the furnace together with the other ingredients of the glass as is commonly practiced.

The iron content of this waste material is usually within the range of from 1 to 2½ per cent. In some instances this impurity may be undesirable and accordingly the waste sand may be treated magnetically or with a 10 per cent solution of hydrochloric or sulphuric acid to remove all or a portion of the iron. This process constitutes no part of the present invention. After the metallic impurities have been removed, the sand is treated as hereinbefore described.

The preliminary step of purification is not, however, necessary to condition the sand for further use. For example, at present, a small percentage of iron is deliberately added to certain glass batches in order to impart a greenish coloration thereto. The resultant glass is of particular value in the preparation of safety glass, for the iron content acts as a filter of actinic light and prevents rapid deterioration of the reinforcing layer. In glass used in manufacturing bottles or containers, the presence of iron would also be of no consequence, and the sand entering into the glass need not be purified.

Usually the waste sand contains such amount of glass debris as to obviate the combination therewith of cullet in the preparation of glass batch. However, in some cases additional cullet may be incorporated with the sand, as required. It has also been found that in the surfacing of plate glass the amount of sand consumed in the grinding operation exceeds the weight of the glass. Accordingly, the entire requirement of sand for subsequent glass batches may be obtained from these waste materials.

By my process, therefore, I am able to provide for the disposal of sand which has heretofore been of no value. The sand can be recovered or reclaimed at a very low cost and accordingly the production costs of glass are reduced. The glass content of the waste sand is not lost in my process, but instead is available as a substitute for all or a part of the cullet which will be required in subsequent batches.

Manifestly, the processes herein defined and described may be subjected to various modifications and alterations without departing from the spirit of the invention or the scope of the appended claim.

What I claim is:

A process of manufacturing glass which comprises heating a mixture of finely divided glass and silica obtained from the grinding of plate glass to a temperature sufficient only to sinter the glass thereby forming porous, friable agglomerates, subsequently mixing the agglomerates with soda ash and other glass-forming ingredients and melting the mixture down to form glass.

GEORGE J. BAIR.